US010802515B2

(12) United States Patent
Mirza et al.

(10) Patent No.: US 10,802,515 B2
(45) Date of Patent: Oct. 13, 2020

(54) CONTROL TECHNIQUES IN A HEATING, VENTILATION AND AIR CONDITIONING NETWORK BASED ON ENVIRONMENTAL DATA

(71) Applicant: Lennox Industries Inc., Richardson, TX (US)

(72) Inventors: Muhammad Al Mirza, Farmers Branch, TX (US); Darko Hadzidedic, Carrollton, TX (US); Wojciech Grohman, Little Elm, TX (US); Timothy H. Thorson, McKinney, TX (US); Ammar Kailani, Carrollton, TX (US); Timothy E. Wallaert, Wylie, TX (US)

(73) Assignee: Lennox Industries Inc., Richardson, TX (US)

( * ) Notice: Subject to any disclaimer, the term of this patent is extended or adjusted under 35 U.S.C. 154(b) by 924 days.

(21) Appl. No.: 14/451,154

(22) Filed: Aug. 4, 2014

(65) Prior Publication Data

US 2014/0346237 A1    Nov. 27, 2014

Related U.S. Application Data

(63) Continuation of application No. 12/603,431, filed on Oct. 21, 2009, now Pat. No. 8,798,796, which is a continuation-in-part of application No. 12/258,659, filed on Oct. 27, 2008, now abandoned.

(60) Provisional application No. 61/167,135, filed on Apr. 6, 2009, provisional application No. 61/852,676, filed on Apr. 7, 2009.

(51) Int. Cl.
| | |
|---|---|
| *G05D 27/02* | (2006.01) |
| *G05D 23/24* | (2006.01) |
| *G05D 23/19* | (2006.01) |
| *F24F 11/30* | (2018.01) |
| *F24F 110/50* | (2018.01) |

(52) U.S. Cl.
CPC .............. *G05D 27/02* (2013.01); *F24F 11/30* (2018.01); *G05D 23/1931* (2013.01); *G05D 23/24* (2013.01); *F24F 2110/50* (2018.01)

(58) Field of Classification Search
CPC ...... F24F 2011/0017; F24F 2011/0019; G05D 23/1927
See application file for complete search history.

(56) References Cited

U.S. PATENT DOCUMENTS

| | | | | |
|---|---|---|---|---|
| 5,394,934 | A * | 3/1995 | Rein | F24F 11/0009 165/200 |
| 6,406,367 | B1 * | 6/2002 | Chou | F24F 11/0017 454/229 |
| 9,625,922 | B2 * | 4/2017 | Graham | G05D 23/1927 |
| 10,211,999 | B2 * | 2/2019 | Pelton | H04L 12/2829 |
| 2002/0099482 | A1 * | 7/2002 | Reese, II | F01P 11/14 701/31.4 |

(Continued)

*Primary Examiner* — Frantz F Jules
*Assistant Examiner* — Alexis K Cox
(74) *Attorney, Agent, or Firm* — Baker Botts L.L.P.

(57) ABSTRACT

An HVAC controller includes (1) an interface coupled to an air quality sensor proximate to the premises and coupled to a data source external to the HVAC system, the interface configured to receive environmental data from both the air quality sensor and the external data source and (2) a processor configured to automatically operate a demand unit of the HVAC system based on the environmental data.

12 Claims, 7 Drawing Sheets

(56) References Cited

U.S. PATENT DOCUMENTS

| | | | | |
|---|---|---|---|---|
| 2002/0124992 | A1* | 9/2002 | Rainer | G05D 23/1931 165/11.1 |
| 2003/0040819 | A1* | 2/2003 | Gonzales | H04L 12/2803 700/83 |
| 2005/0125117 | A1* | 6/2005 | Breed | G07C 5/008 701/31.5 |
| 2005/0144963 | A1* | 7/2005 | Peterson | F24F 11/0001 62/178 |
| 2005/0156731 | A1* | 7/2005 | Chapman, Jr. | F24F 11/0012 340/521 |
| 2005/0192727 | A1* | 9/2005 | Shostak | B60C 11/24 701/37 |
| 2006/0025897 | A1* | 2/2006 | Shostak | B60C 23/005 701/1 |
| 2006/0154596 | A1* | 7/2006 | Meneely, Jr. | F24F 11/0017 454/256 |
| 2007/0278320 | A1* | 12/2007 | Lunacek | G05D 23/1902 236/94 |
| 2012/0065783 | A1* | 3/2012 | Fadell | F24F 11/006 700/276 |
| 2012/0232969 | A1* | 9/2012 | Fadell | G06Q 10/20 705/14.4 |
| 2013/0231792 | A1* | 9/2013 | Ji | G05B 19/02 700/291 |
| 2015/0032264 | A1* | 1/2015 | Emmons | F24F 11/0017 700/276 |

* cited by examiner

CONTROL TECHNIQUES IN A HEATING, VENTILATION AND AIR CONDITIONING NETWORK BASED ON ENVIRONMENTAL DATA

CROSS-REFERENCE TO RELATED APPLICATIONS

This application is a continuation of U.S. patent application Ser. No. 12/603,431, filed by Grohman, et al., on Oct. 21, 2009, entitled "GENERAL CONTROL TECHNIQUES IN A HEATING, VENTILATION AND AIR CONDITIONING NETWORK", which claims the benefit of U.S. Provisional Application Ser. No. 61/167,135, filed by Grohman, et al., on Apr. 6, 2009, entitled "Comprehensive HVAC Control System", and U.S. Provisional Application Ser. No. 61/852,676, filed by Grohman, et al., on Apr. 7, 2009, entitled "Comprehensive HVAC Control System", and is a continuation-in-part application of application Ser. No. 12/258,659, filed by Grohman on Oct. 27, 2008, entitled "Apparatus and Method for Controlling an Environmental Conditioning Unit," each of which are commonly assigned with this application and incorporated herein by reference. This application is also related to the following U.S. patent applications, which are filed on even date herewith, commonly assigned with this application and incorporated herein by reference:

| Ser. No. | Inventors | Title |
|---|---|---|
| 12/603,464 | Grohman, et al. | "Alarm and Diagnostics System and Method for a Distributed-Architecture Heating, Ventilation and Air Conditioning Network" |
| 12/603,534 | Wallaert, et al. | "Flush Wall Mount Controller and In-Set Mounting Plate for a Heating, Ventilation and Air Conditioning System" |
| 12/603,449 | Thorson, et al. | "System and Method of Use for a User Interface Dashboard of a Heating, Ventilation and Air Conditioning Network" |
| 12/603,382 | Grohman | "Device Abstraction System and Method for a Distributed-Architecture Heating, Ventilation and Air Conditioning Network" |
| 12/603,526 | Grohman, et al. | "Communication Protocol System and Method for a Distributed-Architecture Heating, Ventilation and Air Conditioning Network" |
| 12/603,527 | Hadzidedic | "Memory Recovery Scheme and Data Structure in a Heating, Ventilation and Air Conditioning Network" |
| 12/603,490 | Grohman | "System Recovery in a Heating, Ventilation and Air Conditioning Network" |
| 12/603,473 | Grohman, et al. | "System and Method for Zoning a Distributed-Architecture Heating, Ventilation and Air Conditioning Network" |
| 12/603,525 | Grohman, et al. | "Method of Controlling Equipment in a Heating, Ventilation and Air Conditioning Network" |
| 12/603,512 | Grohman, et al. | "Programming and Configuration in a Heating, Ventilation and Air Conditioning Network" |

TECHNICAL FIELD

This application is directed, in general, to distributed-architecture heating, ventilation and air conditioning (HVAC) system, more specifically, to general control techniques in an HVAC network.

BACKGROUND

Climate control systems, also referred to as HVAC systems (the two terms will be used herein interchangeably), are employed to regulate the temperature, humidity and air quality of premises, such as a residence, office, store, warehouse, vehicle, trailer, or commercial or entertainment venue. The most basic climate control systems either move air (typically by means of an air handler or, or more colloquially, a circulation fan or blower), heat air (typically by means of a furnace) or cool air (typically by means of a compressor-driven refrigerant loop). A thermostat is typically included in the climate control systems to provide some level of automatic temperature control. In its simplest form, a thermostat turns the climate control system on or off as a function of a detected temperature. In a more complex form, a thermostat may take other factors, such as humidity or time, into consideration. Still, however, the operation of a thermostat remains turning the climate control system on or off in an attempt to maintain the temperature of the premises as close as possible to a desired setpoint temperature. Climate control systems as described above have been in wide use since the middle of the twentieth century.

SUMMARY

In a first aspect, a controller for HVAC system of a premises is disclosed. In one embodiment, the controller includes: (1) an interface coupled to an air quality sensor proximate to the premises and coupled to a data source external to the HVAC system, the interface configured to receive environmental data from both the air quality sensor and the external data source and (2) a processor configured to automatically operate a demand unit of the HVAC system based on the environmental data.

In a second aspect, the disclosure provide another controller. In one embodiment, this controller includes: (1) an interface configured to receive environmental data from an air quality sensor proximate to the premises or from a data source external to the HVAC system and (2) a processor configured to automatically operate at least one demand unit of the HVAC system in response to the environmental data.

In a third aspect, the disclosure provides a controller configured to operate demand units of an HVAC system according to a method, wherein the controller is coupled to the demand units via a data bus of a HVAC network. In one embodiment, the method includes: (1) gathering, by the HVAC network, current and forecasted weather information, wherein the HVAC network receives the forecasted weather information from an Internet, coupled to the HVAC network through a gateway and (2) deciding upon HVAC conditioning states by the HVAC network based upon both the current and the forecasted weather information.

BRIEF DESCRIPTION

Reference is now made to the following descriptions taken in conjunction with the accompanying drawings, in which.

DETAILED DESCRIPTION

As stated above, conventional climate control systems have been in wide use since the middle of the twentieth century and have, to date, generally provided adequate temperature management. However, it has been realized that more sophisticated control and data acquisition and processing techniques may be developed and employed to improve the installation, operation and maintenance of climate control systems.

Described herein are various embodiments of an improved climate control, or HVAC, system in which at least multiple components thereof communicate with one another via a data bus. The communication allows identity, capability, status and operational data to be shared among the components. In some embodiments, the communication also allows commands to be given. As a result, the climate control system may be more flexible in terms of the number of different premises in which it may be installed, may be easier for an installer to install and configure, may be easier for a user to operate, may provide superior temperature and/or relative humidity (RH) control, may be more energy efficient, may be easier to diagnose and perhaps able to repair itself, may require fewer, simpler repairs and may have a longer service life.

Figure 1:
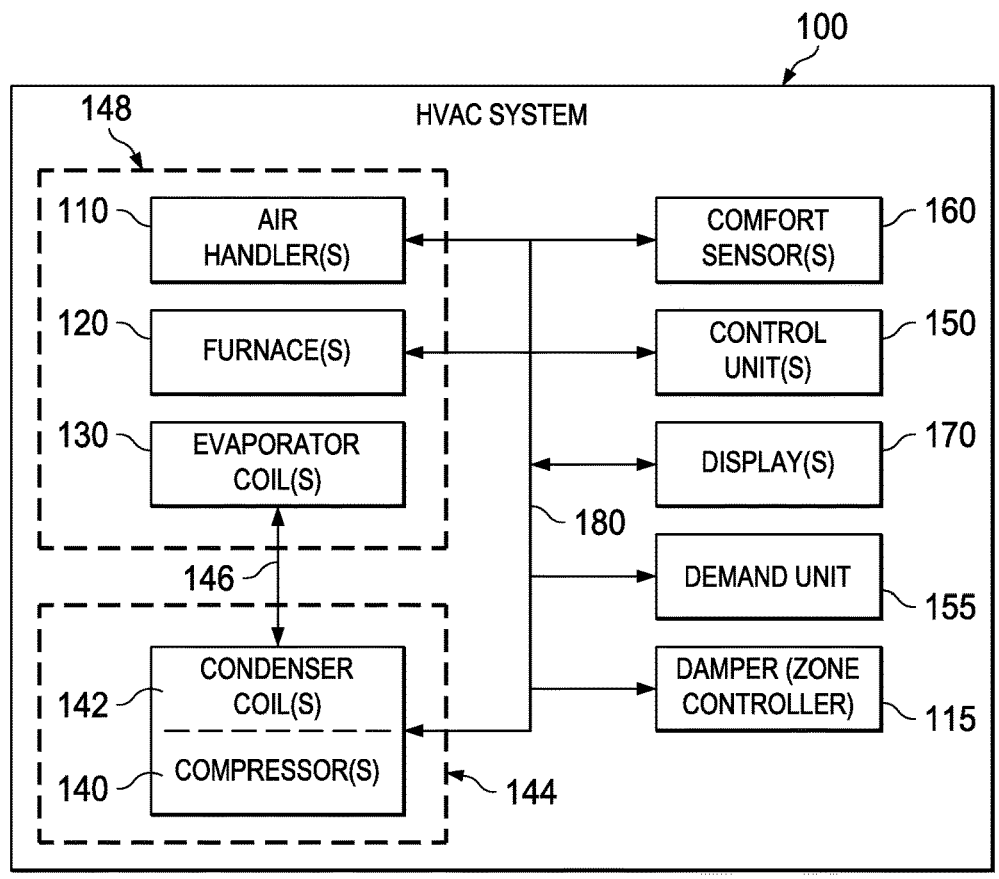
FIG. 1 is a high-level block diagram of an HVAC system within which a device abstraction system and method may be contained or carried out.

FIG. 1 is a high-level block diagram of an HVAC system, generally designated 100. The HVAC system may be referred to herein simply as "system 100" for brevity. In one embodiment, the system 100 is configured to provide ventilation and therefore includes one or more air handlers 110. In an alternative embodiment, the ventilation includes one or more dampers 115 to control air flow through air ducts (not shown.) Such control may be used in various embodiments in which the system 100 is a zoned system. In the context of a zoned system 100, the one or more dampers 115 may be referred to as zone controllers 115. In an alternative embodiment, the system 100 is configured to provide heating and therefore includes one or more furnaces 120, typically associated with the one or more air handlers 110. In an alternative embodiment, the system 100 is configured to provide cooling and therefore includes one or more refrigerant evaporator coils 130, typically associated with the one or more air handlers 110. Such embodiment of the system 100 also includes one or more compressors 140 and associated condenser coils 142, which are typically associated in one or more so-called "outdoor units" 144. The one or more compressors 140 and associated condenser coils 142 are typically connected to an associated evaporator coil 130 by a refrigerant line 146. In an alternative embodiment, the system 100 is configured to provide ventilation, heating and cooling, in which case the one or more air handlers 110, furnaces 120 and evaporator coils 130 are associated with one or more "indoor units" 148, e.g., basement or attic units.

For convenience in the following discussion, a demand unit 155 is representative of the various units exemplified by the air handler 110, furnace 120, and compressor 140, and more generally includes an HVAC component that provides a service in response to control by the control unit 150. The service may be, e.g., heating, cooling, or air circulation. The demand unit 155 may provide more than one service, and if so, one service may be a primary service, and another service may be an ancillary service. For example, for a cooling unit that also circulates air, the primary service may be cooling, and the ancillary service may be air circulation (e.g. by a blower).

The demand unit 155 may have a maximum service capacity associated therewith. For example, the furnace 120 may have a maximum heat output (often expressed in terms of British Thermal Units, or BTU), or a blower may have a maximum airflow capacity (often expressed in terms of cubic feet per minute, or CFM). In some cases, the addressable unit 155 may be configured to provide a primary or ancillary service in staged portions. For example, blower may have two or more motor speeds, with a CFM value associated with each motor speed.

One or more control units 150 control one or more of the one or more air handlers 110, the one or more furnaces 120 and/or the one or more compressors 140 to regulate the temperature of the premises, at least approximately. In various embodiments to be described, the one or more displays 170 provide additional functions such as operational, diagnostic and status message display and an attractive, visual interface that allows an installer, user or repairman to perform actions with respect to the system 100 more intuitively. Herein, the term "operator" will be used to refer collectively to any of the installer, the user and the repairman unless clarity is served by greater specificity.

One or more separate comfort sensors 160 may be associated with the one or more control units 150 and may also optionally be associated with one or more displays 170. The one or more comfort sensors 160 provide environmental data, e.g. temperature and/or humidity, to the one or more control units 150. An individual comfort sensor 160 may be physically located within a same enclosure or housing as the control unit 150. In such cases, the commonly housed comfort sensor 160 may be addressed independently. However, the one or more comfort sensors 160 may be located separately and physically remote from the one or more control units 150. Also, an individual control unit 150 may be physically located within a same enclosure or housing as a display 170. In such embodiments, the commonly housed control unit 150 and display 170 may each be addressed independently. However, one or more of the displays 170 may be located within the system 100 separately from and/or physically remote to the control units 150. The one or more displays 170 may include a screen such as a liquid crystal display (not shown).

Although not shown in FIG. 1, the HVAC system 100 may include one or more heat pumps in lieu of or in addition to the one or more furnaces 120, and one or more compressors 140. One or more humidifiers or dehumidifiers may be employed to increase or decrease humidity. One or more dampers may be used to modulate air flow through ducts (not shown). Air cleaners and lights may be used to reduce the air pollution. Air quality sensors may be used to determine overall air quality.

Finally, a data bus 180, which in the illustrated embodiment is a serial bus, couples the one or more air handlers 110, the one or more furnaces 120, the one or more evaporator coils 130, the one or more condenser coils 142 and compressors 140, the one or more control units 150, the one or more remote comfort sensors 160 and the one or more displays 170 such that data may be communicated therebetween or thereamong. As will be understood, the data bus 180 may be advantageously employed to convey one or more alarm messages or one or more diagnostic messages.

Figure 2:
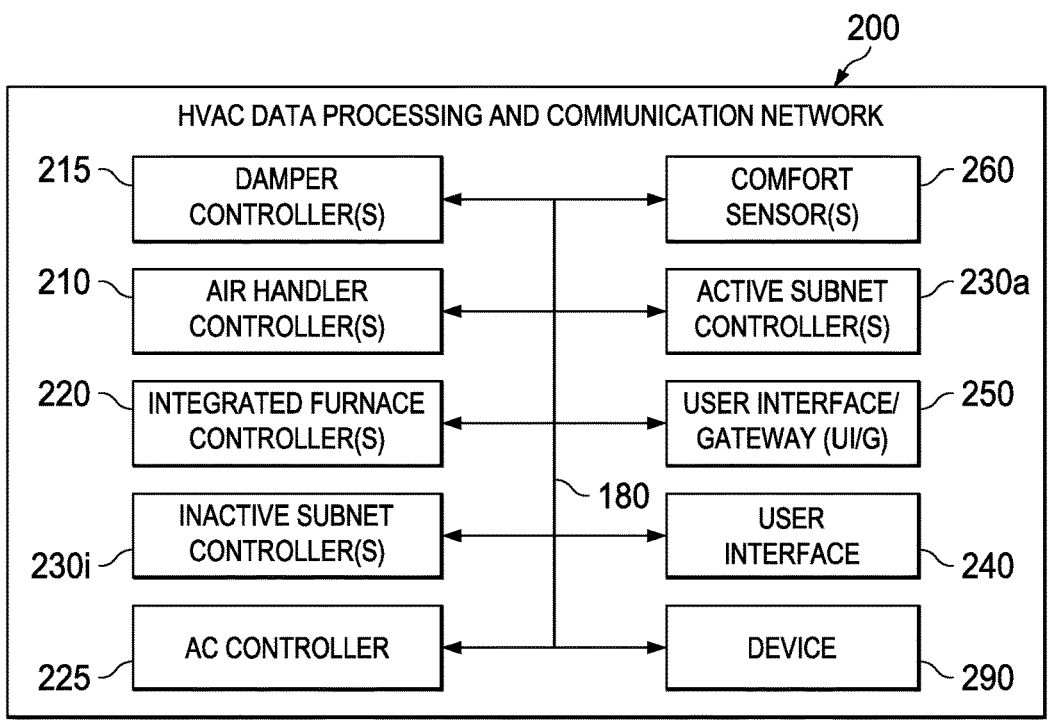
FIG. 2 is a high-level block diagram of one embodiment of an HVAC data processing and communication network 200.

FIG. 2 is a high-level block diagram of one embodiment of an HVAC data processing and communication network 200 that may be employed in the HVAC system 100 of FIG. 1. One or more air handler controllers ("AHCs") 210 may be associated with the one or more air handlers 110 of FIG. 1. One or more integrated furnace controllers ("IFCs") 220 may be associated with the one or more furnaces 120. One or more damper controller modules 215, also referred to as a zone controller module 215, may be associated with the one or more dampers 114 to interface the one or more dampers to the data bus 180. One or more AC controllers 225 may be associated with one or more evaporator coils 130 and one or more condenser coils 142 and compressors 140 of FIG. 1. The network 200 includes an active subnet controller ("aSC") 230a and an inactive subnet controller ("iSC") 230i. The aSC 230a is responsible for configuring and monitoring the system 100 and for implementation of heating, cooling, air quality, ventilation or any other functional algorithms therein. Two or more aSCs 230a may also be employed to divide the network 200 into subnetworks, or subnets, simplifying network configuration, communication and control. The iSC 230i is a subnet controller that does not actively control the network 200. In some embodiments, the iSC 230i listens to all messages passed over the data bus 180, and updates its internal memory to match that of the aSC 230a. In this manner, the iSC 230i may backup parameters stored by the aSC 230a, and may be used as an active subnet controller if the aSC 230a malfunctions. Typically there is only one aSC 230a in a subnet, but there may be multiple iSCs therein, or no iSC at all. Herein, where the distinction between an active or a passive SC is not germane the subnet controller is referred to generally as an SC 230.

A user interface (UI) 240 provides a means by which an operator may communicate with the remainder of the network 200. In an alternative embodiment, a user interface/gateway (UI/G) 250 provides a means by which a remote operator or remote equipment may communicate with the remainder of the network 200. Such a remote operator or equipment is referred to generally as a remote entity. A comfort sensor interface 260 may provide an interface between the data bus 180 and each of the one or more comfort sensors 160.

Each of the components 210, 220, 225, 230a, 230i, 240, 250, 260 may include a general interface device configured to interface to the bus 180, as described below. (For ease of description any of the networked components, e.g., the components 210, 220, 225, 230a, 230i, 240, 250, 260 may be referred to generally herein as a device 290. In other words, the device 290 of FIG. 2 is a proxy for any of a furnace, a heat pump, a subnet controller, etc., and that device's associated interface means.) The data bus 180 in some embodiments is implemented using the Bosch CAN (Controller Area Network) specification, revision 2, and may be synonymously referred to herein as a residential serial bus (RSBus) 180. The data bus 180 provides communication between or among the aforementioned elements of the network 200. It should be understood that the use of the term "residential" is nonlimiting; the network 200 may be employed in any premises whatsoever, fixed or mobile. In wireless embodiments, the data bus 180 may be implemented, e.g., using Bluetooth™ or a similar wireless standard.

In the illustrated embodiment, a user interface ("UI") 240 provides a means by which a person may communicate with the remainder of the network 200. In an alternative embodiment, a user interface/gateway ("UI/G") 250 provides an approach by which a remote person or remote equipment may communicate with the remainder of the network 200. Such a remote person or equipment is referred to generally as a remote entity. Components connected to the data bus 180 may be referred to in the following description generally as a bus interface 260, also referred to herein simply as an "interface 260." The interface 260 may provide network interface functions to any of the aforementioned HVAC system components, e.g., the air handler 110, furnace 120, coils 130 or compressor 140 over the data bus 180. The data bus 180, which may be referred to hereinafter as a residential serial bus, or RSBus, provides communication between or among the aforementioned elements of the network 200. It should be understood that the use of the term "residential" is nonlimiting; the network 200 may be employed in any premises whatsoever, personal or business, fixed or mobile.

Generally, the network 200 allows for the remote comfort sensors 160, the controller 150, and user display 165 and/or remote user displays 170 to operate independently as separate logical units, and can be located in separate locations within the network 200. This is unlike the prior art, wherein these functionalities were required to be located within a single physical and logical structure.

Figure 3A:
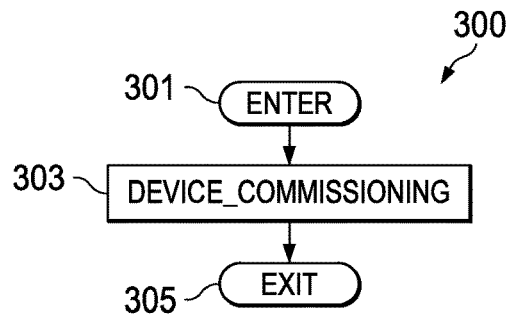
FIG. 3A is a diagram of a series of steps in an event sequence that depicts a device commissioning in an HVAC network having an active subnet controller.

Turning now to FIG. 3A, illustrated is a diagram 300 of a series of steps that occur in relation to a commissioning of the unit 155 in the illustrated embodiment. The diagram 300 includes an enter state 301, a device commissioning state 303, and an exit state 305. The HVAC system 100 can be described as being partitioned into a plurality of subnets, each subnet controlled by its own active subnet controller 230a.

Device commissioning can generally be defined as setting operational parameters for a device in the network of the HVAC system, including its installation parameters. Generally, device commissioning 300 is used by the subnet controller 230 when it is active to: a) set operating "Installer Parameters" for a networked device, such as air handlers 110, (henceforth to be referred to collectively, for the sake of convenience, as the unit 155, although other devices are also contemplated), b) to load UI/Gs 240, 250 with names and settings of "Installer Parameters and Features" of the units 155, c) to configure replacement parts for the units 155, and d) to restore values of "Installer Parameters and Features" in units 155 if those "Parameters and Features" were lost due to memory corruption or any other event. Device commissioning is a process used in the HVAC system 100, either in a "configuration" mode or in a "verification" mode.

In the illustrated embodiment and in the "configuration" mode, the unit 155 shares its information with the subnet controller 230a in an anticipation of being employable in the HVAC system 100, and an appropriate subnet. Generally, the commissioning process 300 provides a convenient way to change or restore functional parameters, both for the subnet controller 230a and the unit 155.

In both the "verification" mode and the "configuration" mode, the unit 155 is checked for memory errors or other configuration or programming errors. There are differences in device 290 behavior between the "configuration" mode and in the "verification" mode, to be detailed below.

The "subnet startup" mode programs the subnet controller 230 to be active. The "subnet startup" mode enables subnet communications, (i.e., communication within a subnet), and also deactivates a "link" sub-mode. A "link" mode may be generally defined as a mode that allows a number of subnets to work together on the same HVAC network 200, and that assigns subnet numbers for each subnet to allow this communication.

The "installer test" mode is employed when an installer installs and tests aspects and units of the HVAC system 100. The "normal operations" mode is an ongoing operation of devices 290 of the HVAC system 100 in a normal use.

More specifically, the device commissioning state machine 300 can be employed in: a) the "configuration" mode, which is invoked when transitioning to the commissioning state from the "subnet startup mode" or "installer test" mode, or the "normal mode," or b) a "verification" mode. In the illustrated embodiment, the "verification" mode is invoked when transitioning to the commissioning state from the "subnet startup" mode.

The following describes an illustrative embodiment of a process of commissioning 300 the HVAC unit 155, first for a "configuration" mode, and then for a "verification" mode. The process of commissioning differs from a "subnet startup," in that commissioning requires that the network configuration, including configuration and activation of subnet controllers 230, has already been completed before the commissioning 300 of the device 260 can start. In the illustrated embodiment, there can be more than one subnet controller 230 on a subnet, but only subnet controller 230a is active at any one time.

In one embodiment, in order to enter into the state 320 of the process 300 in the "configuration" mode, the unit 155 receives either: a) an "aSC" ('active subnet controller') Device Assignment message," having "Assigned State" bits set to "Commissioning"; or b) a receipt of an "aSC Change State" message, with "New aSC State" bits set to "Commissioning," from the active subnet controller 230. For both "configuration" and "verification" modes, an "aSC Device Assignment" message can be generally regarded as a message that assigns the unit 155 to a particular active subnet controller 230a. For both "configuration" and "verification" modes, an "aSC Change State" message can be generally regarded as a message that starts and ends employment of the commissioning state diagram 300 for the units 155 and all other devices on the subnet.

In the illustrated embodiment and in the state 320 in the configuration mode, all units 155 respond to the "aSC Device Assignment" message with their respective "Device Status" messages, indicating that the units 155 are now in commissioning process 300 due to their response to this previous message. For both "configuration" and "verification" modes, the "Device Status" message can be generally defined as message that informs the active subnet controller 230a of what actions are being taken by the unit 155 at a given time.

However, alternatively, in other embodiments, in the state 320 in the "configuration" mode, if the units 155 are instead busy, as indicated by "aSC Acknowledge" bits of the "Device Status" message sent to the subnet controller 230a set as a "Control Busy," the active subnet controller 230a will wait for the busy units 155 to clear their "aSC Acknowledge" bits before proceeding with further elements of the Commissioning 320 process. The units 155 then resend their "Device Status" messages as soon as they are no longer busy.

From this point on, all units 155 send their "Device Status" messages periodically and on any status change, both during and after the commissioning 300. If the unit 155 does not clear its "aSC Acknowledge" bits within a minute (indication its control is no longer "busy"), the active subnet controller 230a sends an "Unresponsive Device2" alarm for each such unit 155. If in "configuration" mode, the active subnet controller 230a remains in the waiting mode indefinitely, until the unit 155 responds correctly, or the subnet is reset manually or after a timeout is reached. In "verification" mode the active subnet controller 230a proceeds further to exit the state.

In the illustrated embodiment and in the "configuration" mode, each unit 155 remembers all of its optional sensors that are currently attached to it. Furthermore, each unit 155 may store a local copy in its non-volatile memory ("NVM") of all of any other unit features that it is dependent on. A unit 155 feature can be generally defined as any datum that is fixed and cannot be changed by the installer, serviceman or the home owner. Changing of a "Feature" value normally involves reprogramming of the units 155 firmware.

In at least some embodiments, a feature is something that is fixed value, that is hard-wired into a device. In other words, no installer or home owner can change it. Features are programmed into the unit 155 during a manufacturing or an assembly process. Features can be recovered in a home, during a Data non-volatile memory ("NVM") recovery substate of Commissioning state only—the recovery substate happens automatically and without installer or user intervention. In a further embodiment, parameters can be changed by the installers only. In a yet further embodiment, the HVAC system 100 employs "variables"—those can be changed by the installers and also the home owners.

In some embodiments, a "Parameter List" is normally a Feature that contains a special list of specific parameters included in the unit 155. Parameter values can be changed, and their state can be changed also (from enabled to disabled and vice-versa), but their presence is set once and for all in a given firmware version. Therefore, a list of Parameters (not their values) is also fixed, and is thus treated as a "Feature."

However, although elements of the "configuration" mode commissioning and "verification" mode commissioning are similar, when the active subnet controller 230 is in "verification" mode instead of in "configuration" mode, the active subnet controller 230a can exit commissioning 300 regardless of the value of the alarms of the units 155. However, alternatively, if the active subnet controller 230a is in "configuration" mode, the active subnet controller 230a will not exit from its commissioning state 300 for as long as at least one unit's 155 "aSC Acknowledge" flags are set to "Control Busy." In one embodiment of the "verification" mode, the active subnet controller 230a timeouts the installation and resets the subnet to default parameters.

In the "verification" mode, the unit 155 operates with a non-corrupted (original or restored copy) NVM, each unit 155 checks any of its attached sensors to see if they match with the parameters that were present in a most recent configuration of the unit 155. In some embodiments, alarms are generated by the unit 155 for missing or malfunctioning sensors as soon as the faulty condition is detected, to be employed by the user interfaces and gateways present on the subnet to notify the installer or homeowner of the encountered problem. The unexpected absence of certain sensors may inhibit the operation of the unit 155 or the subnet. This is normally manifested by the signaling of the appropriate Service Bits in the Device Status message used by the active subnet controller 230a, to determine the operational viability or health of the subnet's systems.

In some embodiments, the device commissioning process 300 then transitions into a state 330, and then ends, upon either: a) the last unit 155 receiving all of unit 155 parameters that it is dependent on, when in "verification" mode; or b) upon a request by a user, when in "configuration" mode. The active subnet controller 230a then proceeds to ensure that no subnet unit 155 has its "aSC Acknowledge" flag set to a "Control Busy" state. The "aSC Acknowledge" flag not being set indicates that all of a non-volatile memory of a given unit 155 had been written to with the necessary parameters. If no "Control Busy" state is detected, the active subnet controller 230a then issues the "aSC Change State" message, which forces the unit 155 from a commissioning state to a non-commissioning state, in either a "configuration" or a "verification" mode.

In some embodiments, when the unit 155 in the process 300 fails its NVM data integrity check in an "NVM CRC Check," and the active subnet controller is unable to perform NVM Recovery, the unit 155 instead employs its default data stored in its non-volatile (Flash) memory and/or uses default calculations to initialize the data dependent on other devices in the system. The other device data to be used for commissioning could have been obtained in either the "verification" or "configuration" mode. For data or other parameters that were not transferred or generated as part of that commissioning 300 session, default values are used.

In one embodiment, upon a detection of a system configuration error, such as a missing device whose features or parameters the unit 155 depends upon, it uses the locally stored copy of the other device's features that it depends upon, and ignores any potential feature value conflicts. In another embodiment, the unit 155 uses the locally stored copy of other parameters of the unit 155 that it depends on and ignores any potential dependent parameter value conflicts. In other words, the unit 155 employs a first installed parameter as a template for a second installed parameter on a second device. In a third embodiment, the unit 155 will change its parameter or feature values only if explicitly instructed by the active subnet controller 230 or the UI/G 240, 250.

Figure 3C:
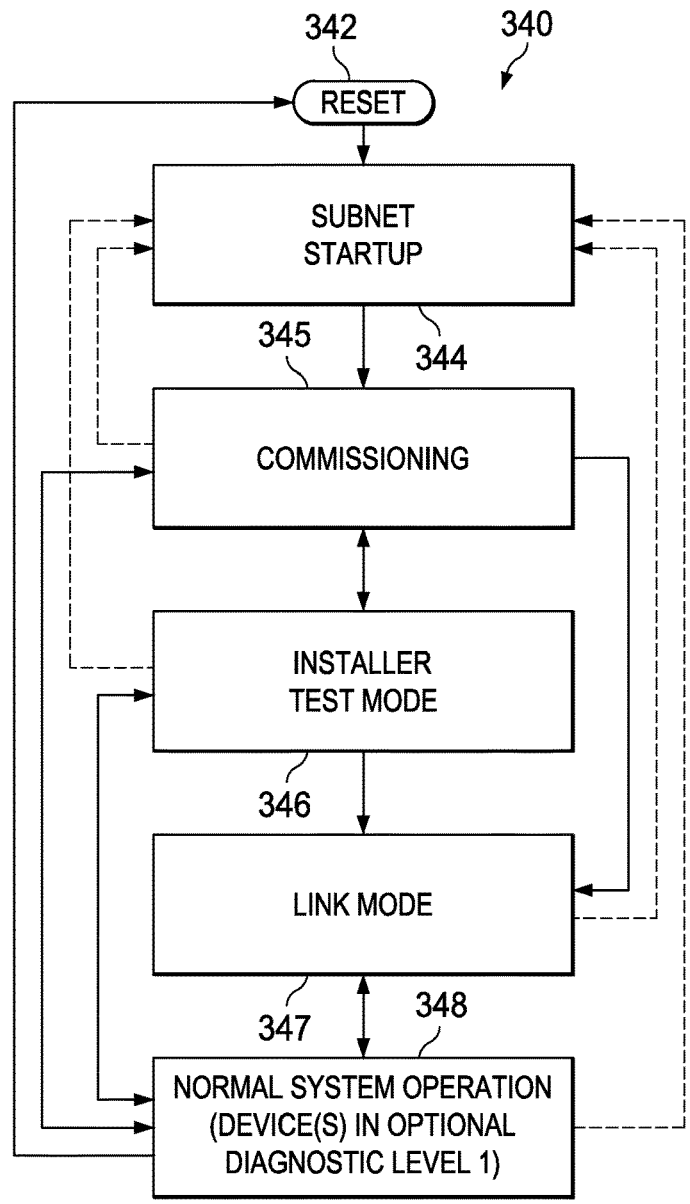
FIG. 3C is a diagram of the above series of steps of FIG. 3B to be followed by a subnet controller to synchronize with a device of the HVAC system.
Figure 3B:
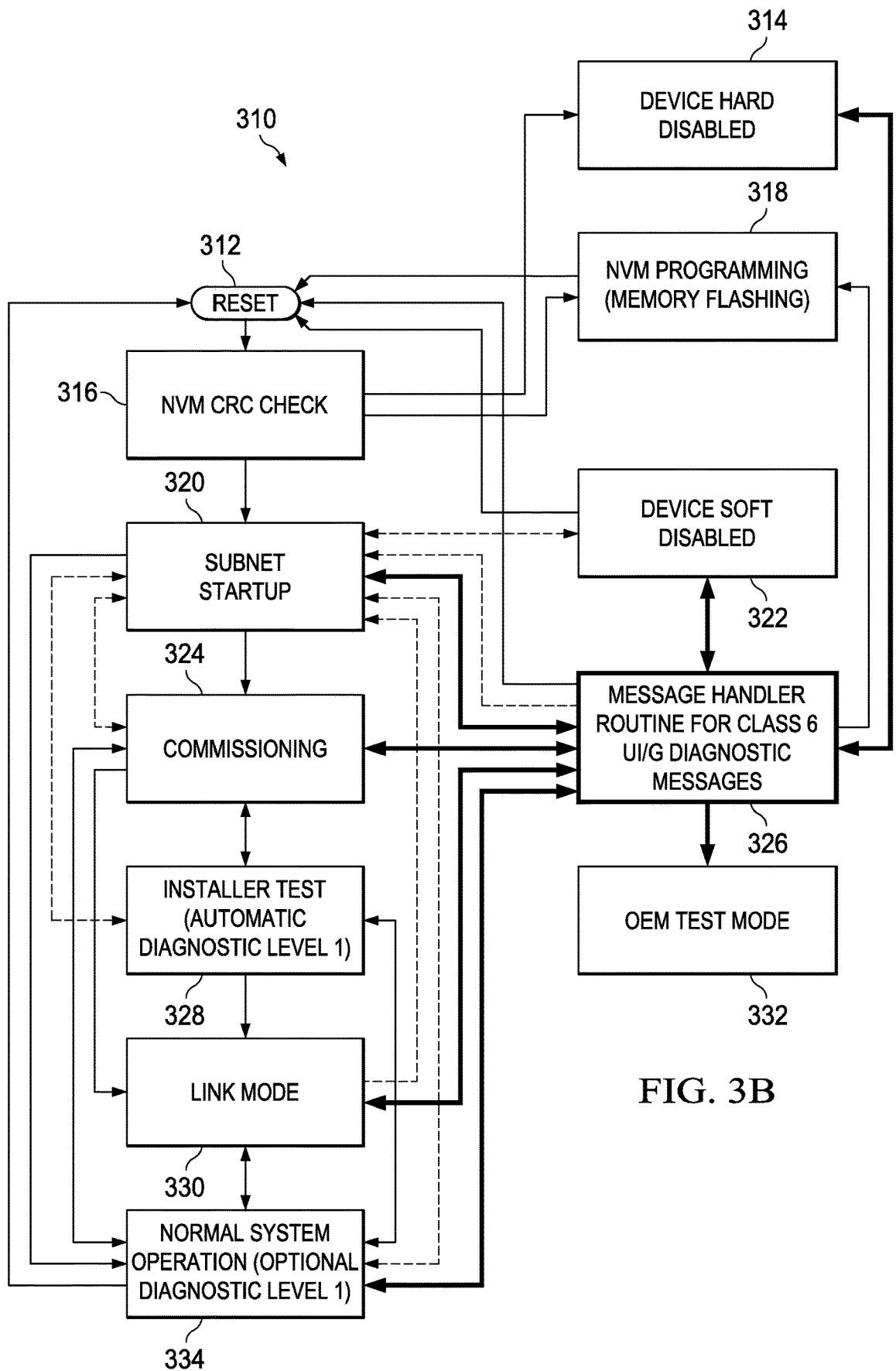
FIG. 3B is a diagram of a series of steps that occur in relation to a setting up of a subnet including an addressable unit.

Turning now to FIG. 3B, illustrated is an HVAC device state machine 310 illustrated for a subnet, including the unit 155, in more detail. Solid lines indicate normal state transitions when the subnet is transitioning from one state to another state, green lines indicate a subroutine call and red lines, alternating dotted and dashed lines indicate unexpected yet valid transitions. All states other than state 326 represent device states, and the state 326 represents a message handling routine.

As is illustrated in the present embodiment, a reset state 312 of a subnet advances to a NVM CRC check 316 for a given device (such as unit 155). If the device fails the test, the device advances to a NVM programming 318. If the device passes, however, then in subnet startup 320, the device is assigned an address (Equipment Type number) and some features and parameters of the unit 155 may be shared with the subnet. Then, in substate 324, device commissioning as described in FIG. 3A occurs. This then leads to an installer test state 328. This, in turn, then leads to a link mode startup 330, as described above. Finally, then in a step 334, normal system operation occurs, although system can reset to state 312 or be brought to states 314 or 332 via diagnostic messages handled in a state 326.

In a further embodiment, during the NVM CRC check 316, the state machine 310 can advance to a NVM programming state 318. This can occur due to such factors as a failure of a non-volatile memory, or an initial programming of the NVM. In a yet further embodiment, each of these units 155 is programmed to deal with one form of a diagnostic message regarding system errors in a state 326, and from there to testing the device 160 itself in an OEM test mode 332.

Turning now to FIG. 3C, illustrated is a state flow diagram 340 for the active subnet controller 230a in relation to the unit 155. In the illustrated embodiment, it is generally the responsibility of the active subnet controller 230a to implement proper state transitions; the other units 155 follow the explicit direction of the aSC 230a for all valid transactions. These state diagrams are included to help ensure that a state of the unit 155 is the same as the subnet controller. In the illustrated embodiment, the SC 230a is responsible for device synchronization. If the unit 155 is detected out of synch with the rest of the system, the aSC 230a, in some embodiments, immediately tries to bring the unit 155 to the current system state, if possible.

If an addressable unit 155 is detected in subnet startup 344, the subnet controller 230a applies asynchronous startup rules, which generally pertain to how many parameters are to be passed between device 290 of the addressable unit 155 and the active subnet controller 230a.

If an addressable unit 155 is detected in commissioning 345, installer test 346, link mode 347 or normal operation 348 substates, the unit 155, in some embodiments, is brought to the current state via a resend of an "aSC Change State" message, which involves transitioning from a first current aSC state to a second current aSC state.

If a unit 155 is detected in OEM Test or Soft Disabled state, the unit 155 shall be reset by the active subnet controller 230a in a step 342. If a unit 155 is detected in "Hard Disabled" or "NVM Programming" state, the active subnet controller 230a assumes that it is not available on the subnet.

In a further embodiment, inactive subnet controllers 230i are required to keep the most up to date subnet and HVAC system configuration information. Inactive subnet controllers 230i listen to all UI/G and aSC messages and continuously update their non-volatile memory to attempt to be as consistent as possible with the settings stored in active subnet controller 230a.

Figure 4:
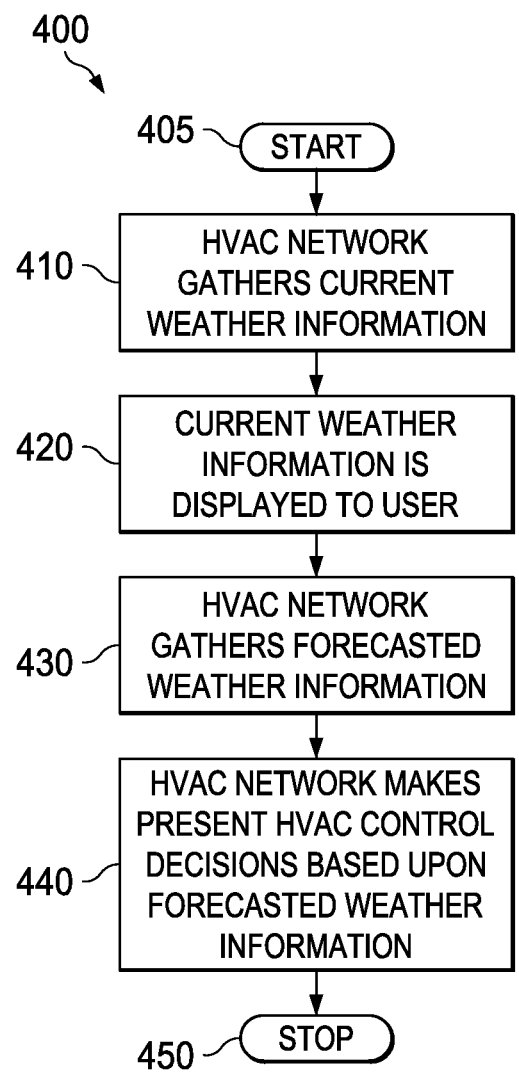
FIG. 4 is an illustration of an exemplary flow method of an ability to display weather information and forecast future HVAC network functionality.

Various Aspects of Control Techniques in an HVAC Network Based on Environmental Data Turning now to FIG. 4, illustrated is an exemplary method 400 for using weather information as to when to provide HVAC networked services. Prior art HVAC systems generally only use indoor temperature to make decisions on when to bring on HVAC equipment to provide conditioning to a space. Prior art HVAC systems do not predict whether outdoor conditions will change, that could affect the decision of HVAC functions.

In the illustrated embodiment, the method 400 gathers both current weather information and forecasted information. The current weather information and forecasted weather information can be displayed on the display(s) 170. This provides a homeowner or other user convenient access to this weather information, without a need to watch for this information on television, the World Wide Web, or newspaper.

In a further embodiment, the method 400 can use the forecasted weather information to make decisions on when to engage and disengage different functionalities of the HVAC network 200. For example, the indoor temperature may indicate that there is a need to bring on cooling. However, the weather forecast may indicate that the outside temperature will drop within the next few hours, and the residence will cool off due to natural cooling. Thus, the method 400 may defer the call for cooling, and instead rely on the outside temperature to drop the temperature of the residence naturally, thus saving the user money. An analogous situation applies to the furnace and heating of the residence due to a predicted warming. In some embodiments, the weather forecast can be input to the communicating system via Internet, cell phone network, phone network, cable network, satellite, or other forms of wired radio frequency communications. In another embodiment, the communication form can be wireless Internet or other forms of wireless communication.

In the method 400, after a start step 405, an HVAC network (such as the HVAC network 200) may gather current weather information in a step 410. This current weather information is displayed to a user in a step 420. In a step 430, the HVAC network gathers forecasted weather information. In a step 440, the HVAC network makes present HVAC control decisions based upon the forecasted weather information. In one embodiment, the forecasted weather information can be conveyed to the HVAC system via the U/IG 250, which can be coupled to the Internet. In another embodiment, home information to be considered by the method 400 when making present HVAC decisions is also entered in the step 440 by the user or installer. The home information can be entered into the active subnet controller 230*a* either during commissioning or normal operation.

Generally, the method 400 allows for controlling of the HVAC system 100 to improve system performance, e.g. comfort and efficiency for a consumer. In one embodiment of the method 400, all equipment control is based on both current and forecasted temperature. Start time can depend on a present indoor temperature, outdoor temperature and overall weather forecast.

For an example of employment of the method 400, electricity prices may vary by time of day, with electric rates being less expensive before 2 pm and more expensive from 2 pm to 5 pm. If the weather forecast indicates that it will be hot in the afternoon, the method 500 may decided to "pre-cool" the space in the morning and rely on the thermal storage of the home to keep it cool in the afternoon. In this manner, the homeowner can shift their cooling energy usage to a time when electric rates are less expensive, thus saving the homeowner money.

In a further embodiment of FIG. 2 as expressed in conjunction with FIGS. 3A-3C, if the active network controller 230*a* generates or receives a 'dehumidify' command, the compressor 140 is disabled during a dehumidify command, thus avoiding overcooling in a given space. In some embodiments, this can be correlated to the weather prediction functionality.

Figure 4A:
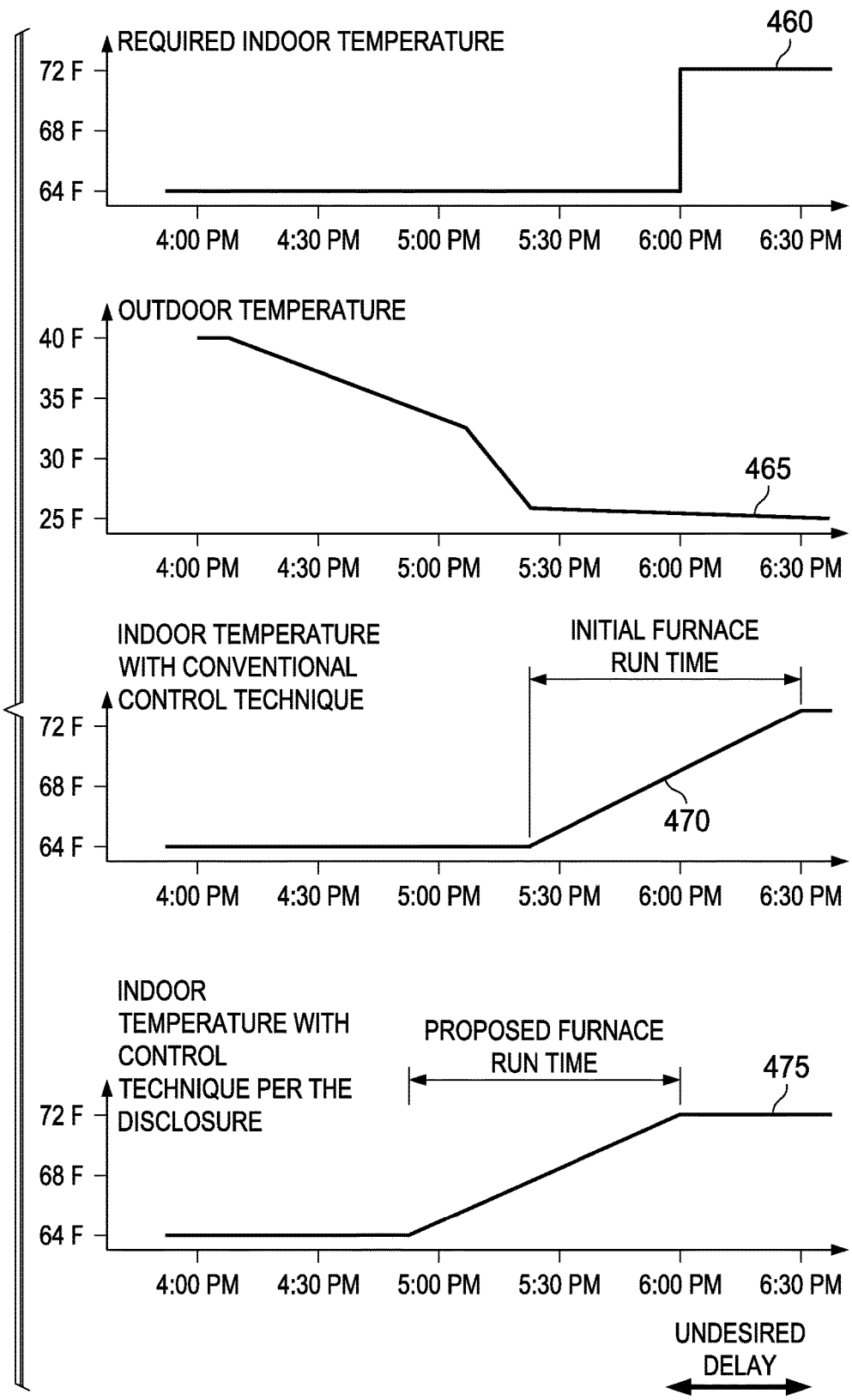
FIGS. 4A and 4B are an illustration of a heating and cooling scenario employing the exemplary weather prediction flow of FIG. 4.

Turning now to FIG. 4A, illustrated is both a prior art and current control technique according to method 400 for heating. As is illustrated in FIG. 4A, a required indoor temperature 460 is illustrated in relation to an outdoor temperature 465. In conventional systems, a furnace would turn on at a point 470, a turn-on point of outside temperature. This would overshoot a desired indoor temperature 460. However, the method 400 allows a turn on time instead at an earlier time based on a weather prediction such as in the step 440, thereby allowing the indoor temperature to reach its target temperature at a desired time.

Figure 4B:
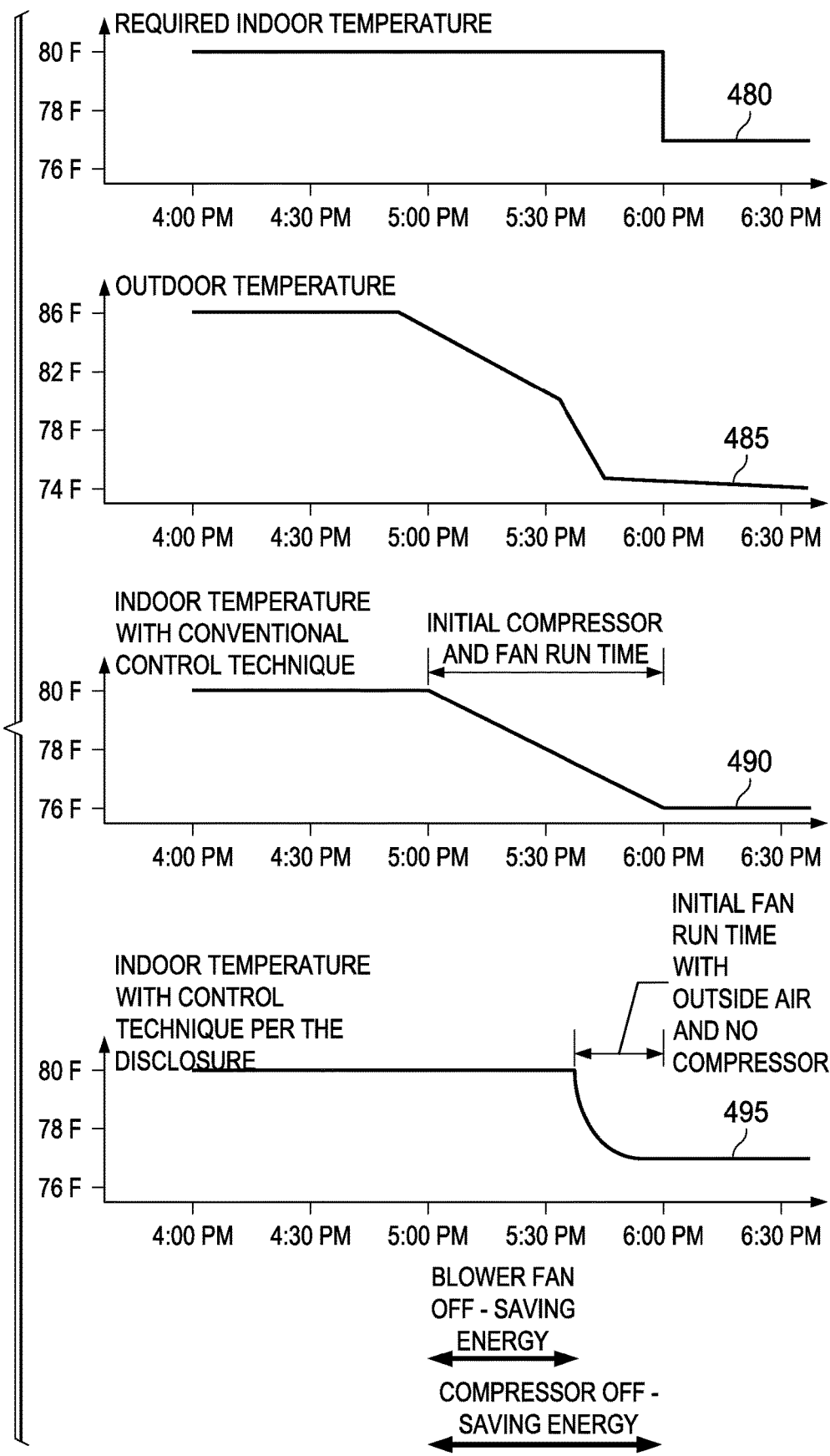

Turning now to FIG. 4B, illustrated is both a prior art and current control technique according to method 400 for cooling. As is illustrated in FIG. 4B, a required indoor temperature 480 is illustrated in relation to an outdoor temperature 485. In conventional systems, a compressor and fan would turn on at a point 490, which could require significant energy. However, the method 400 allows the cooling to be turned on at a later time 495 based on a weather prediction by using a natural coolness of the environment itself such as in the step 440, thereby allowing the indoor temperature to reach its target temperature at a desired time.

Figure 5A:
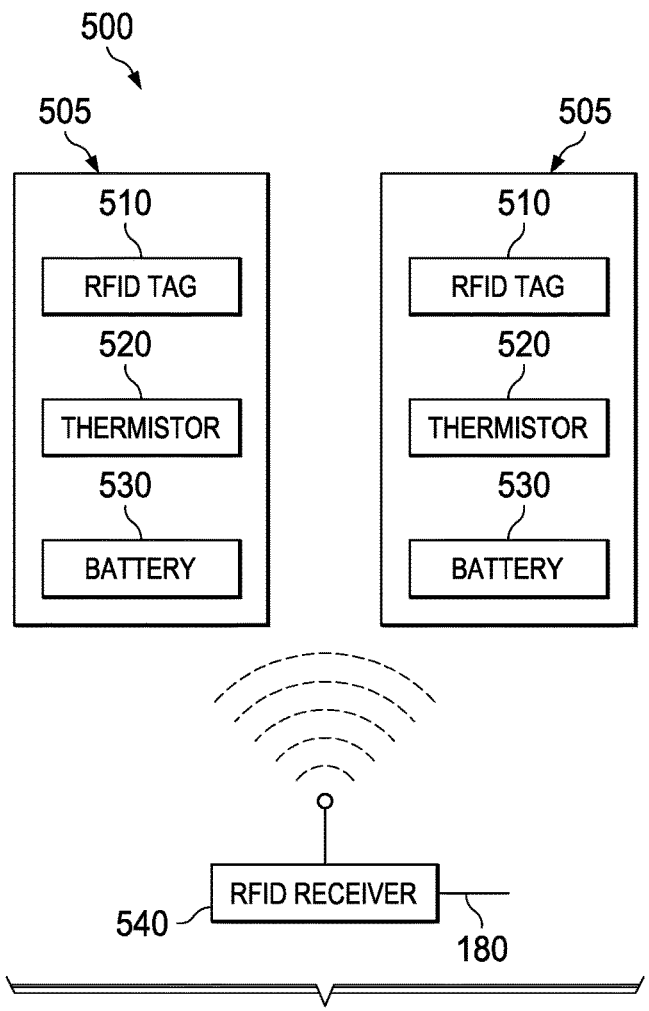
FIG. 5A is an illustration of one embodiment of RFID system for use with a remote comfort sensor in an HVAC network.

Turning now to FIG. 5A, illustrated is a system 500 for employing radio frequency identification ("RFID") with temperature and/or humidity sensors, such as the comfort sensors 280. An RFID may not need batteries to power a microprocessor. Instead, an RFID tag may use an antenna to draw power from a transmitted radio signal as well as derive information from it. A basic principle behind the latter type of RFID is when a proper frequency is transmitted, and an RFID tag draws enough power to radiate an ID or other signal, transmits its ID or another signal to a receiver and then presumably turns back off. All of this can happen without a use of batteries.

In the system 500, illustrated is a sensor 505, which can be the comfort sensor 280, although it may or may not have additional humidity sensing ability. The sensor 500 includes an RFID tag 510, a thermistor 220, and a battery 530. The system 500 also includes an RFID transceiver 540, coupled to the RS bus 180 of the HVAC network 200.

Generally, the system 500 incorporates an RFID into a remote temperature sensor, such as the sensor 505. The temp sensor includes both the RFID tag 510, which reads the thermistor 520. Therefore, the temperature sensors may not be powered all of the time, but perhaps only when the RFID receiver 540 powers up at the request of the HVAC network 200. Therefore, when the sensors 505 are powered by an RF signal, an interrogatory signal, they then read the thermistor 520, broadcast this value, and then go back to "sleep." In a further embodiment, the RF temperature sensor 505 can be incorporated with the battery 530 that only powers the thermistor so that the sensor can put all of its power received from the RFID receiver 540 into transmitting data. In a yet further embodiment, a plurality of sensors 500 are placed around a location, such as a room. The temperature sensors each have a separate broadcast frequency. In one embodiment, the sensor is motionless and thus able to receive power longer, with less loss and better reliability, so it can include low-power active circuitry whose sole purpose is to convert the ADC reading of the thermistor value into an RF message packet.

Figure 5B:
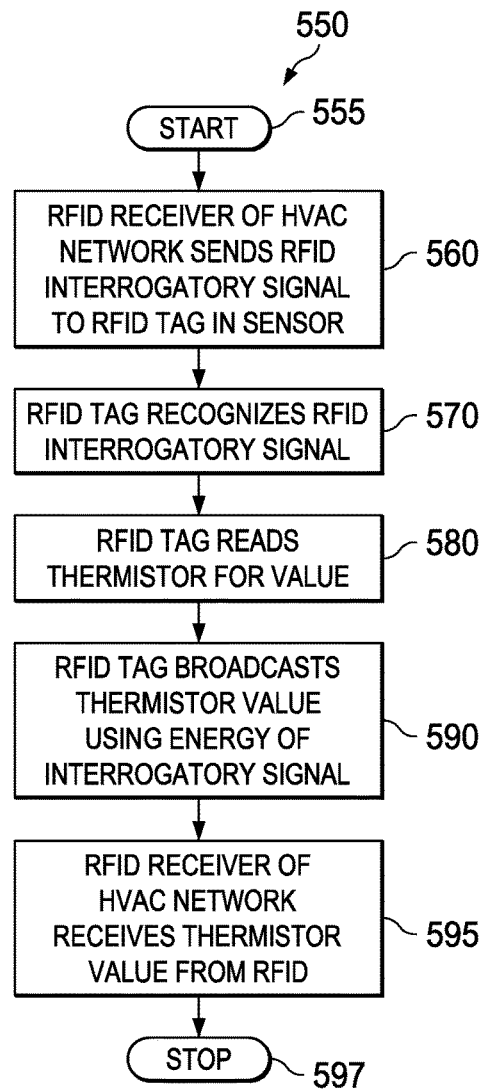
FIG. 5B is an illustration of an exemplary flow method of employment of an RFID with a remote comfort sensor.

Turning now to FIG. 5B, illustrated is an exemplary embodiment of a method 550 for reading a value, such as a temperature, in an RFID, such as the RFID tag 510, that has a value to be employed by an HVAC network, such as the HVAC network 200. After a start step 555, an RFID receiver of a HVAC network sends an interrogatory signal to an RFID tag in a sensor in a step 560, such as the RFID tag 510 in the sensor 505. In a step 570, the RFID tag recognizes the RFID interrogatory signal. In a step 580, the RFID tag reads an internal sensor, such as the thermistor, for a value. In a step 590, the RFID tag broadcasts the thermistor value using the energy of the interrogatory signal. In a step 595, the RFID receiver of the HVAC network receives the thermistor value broadcast from the RFID. The method stops in a step 597.

Those skilled in the art to which this application relates will appreciate that other and further additions, deletions, substitutions and modifications may be made to the described embodiments.

What is claimed is:

1. A controller for a heating, ventilation and air conditioning (HVAC) system of a premises, comprising:
    an interface coupled to a sensor and coupled to a data source external to said HVAC system, said interface configured to:
        transmit an interrogatory signal to a radio frequency identification ("RFID") tag of said sensor; and
        receive environmental data from both said RFID tag of said sensor and said external data source, wherein said environmental data from said external data source comprises environmental data other than sensor data; and
    a processor configured to:
        based on the received environmental data, generate a command to activate a dehumidifier of said HVAC system and prevent operation of a compressor of said HVAC system, thereby preventing overcooling by said HVAC system; and
        automatically operate said HVAC system based on the generated command.

2. The controller as recited in claim 1 further comprising a screen, wherein said processor is further configured to provide said environmental data to said screen and said screen is configured to display said environmental data.

3. The controller as recited in claim 1 wherein said processor is further configured to provide said environmental data to a remote device for display.

4. The controller as recited in claim 1 wherein said sensor is located within said premises.

5. The controller as recited in claim 1 wherein said environmental data from said external data source corresponds to a geographic location of said premises.

6. The controller as recited in claim 5 wherein said environmental data from said external data source includes present and forecasted environmental data.

7. The controller as recited in claim 1 wherein said sensor is located outside of said premises.

8. The controller as recited in claim 1 wherein said processor is configured to automatically operate said HVAC system based on said environmental data from both said sensor and from said external data source.

9. The controller as recited in claim 1 wherein said interface is configured to receive said environmental data from said external data source via a data bus of said HVAC system.

10. The controller as recited in claim 1 wherein the environmental data from the RFID tag is received over a broadcast frequency corresponding to the sensor, the broadcast frequency separate from other broadcast frequencies corresponding to other sensors located in a room with the sensor.

11. The controller as recited in claim 1 wherein the interrogatory signal is an RF signal that causes the sensor to wake up, read a thermistor, broadcast a value read from the thermistor, and go back to sleep.

12. An HVAC network, comprising:
    a controller, comprising:
        an interface coupled to a sensor and coupled to a data source external to the HVAC network, the interface configured to:
            transmit an interrogatory signal to a radio frequency identification ("RFID") tag of the sensor; and
            receive environmental data from both said RFID tag of the sensor and the external data source, wherein the environmental data from the external data source comprises environmental data other than sensor data; and
        a processor configured to:
            based on the received environmental data, generate a command to activate a dehumidifier of the HVAC system and prevent operation of a compressor of the HVAC system, thereby preventing overcooling by the HVAC system; and
            automatically operate the HVAC system based on the generated command;
    a data bus coupled to said controller;
    the sensor comprising the RFID tag; and
    a RFID receiver configured to receive a reading by said RFID tag.

* * * * *